(12) United States Patent
Lamartine et al.

(10) Patent No.: US 6,465,599 B1
(45) Date of Patent: Oct. 15, 2002

(54) CURING COMPOSITION FOR PHENOLIC RESINS

(75) Inventors: Roger Lamartine, Villeurbanne (FR); Philippe Choquard, Geneva (CH)

(73) Assignee: Transdiffusia S.A., Geneva (CH)

( * ) Notice: Subject to any disclaimer, the term of this patent is extended or adjusted under 35 U.S.C. 154(b) by 0 days.

(21) Appl. No.: 09/345,016

(22) Filed: Jul. 2, 1999

Related U.S. Application Data

(63) Continuation-in-part of application No. 08/913,025, filed on Sep. 5, 1997, now abandoned, which is a continuation-in-part of application No. PCT/CH96/00095, filed on Mar. 14, 1996.

(30) Foreign Application Priority Data

Mar. 17, 1995 (CH) ................................................. 768/95

(51) Int. Cl.$^7$ ............................ C08K 5/42; C08L 61/06; C08G 8/00
(52) U.S. Cl. ........................ 528/150; 528/153; 528/155; 528/158
(58) Field of Search ................................ 528/150, 153, 528/155, 158

(56) References Cited

U.S. PATENT DOCUMENTS

| | | | | |
|---|---|---|---|---|
| 3,870,661 A | * | 3/1975 | Crook et al. | |
| 3,872,033 A | * | 3/1975 | Boden et al. | |
| 4,259,464 A | * | 3/1981 | Buriks et al. | |
| 4,434,265 A | * | 2/1984 | Chasar | 524/339 |
| 4,622,414 A | * | 11/1986 | McKervey | 560/61 |

FOREIGN PATENT DOCUMENTS

WO WO96/29363 * 9/1996

OTHER PUBLICATIONS

Koji, Patent Abstracts of Japan, JP 4100 890, Apr. 1992.*
Bohmer et al., J. Org. Chem., 52, p 3200–3205, 1987.*
Gutsche, Acc. Chem. Res., 16, pp. 161–70, 1983.*
Gutsche, Top. Curr. Chem., 123, p 1–47, 1984.*
Ludwig, Sr. et al.Anal. Chem. 58, 2069–72, 1986.*

* cited by examiner

Primary Examiner—Jeffrey Mullis
(74) Attorney, Agent, or Firm—Pitney, Hardin, Kipp & Szuch LLP

(57) ABSTRACT

A curing or bridging composition is useful for effecting the crosslinking of phenolic resoles and the formation of novolaks. The composition comprises from 1% to 99% by weight of partially or totally sulfonated calixarenes and from 99% to 1% of partially or totally sulfonated linear phenolic oligomers, optionally together with partially or totally sulfonated phenol. To the contrary of conventional catalysts for the crosslinking of resoles and the formation of novolaks, the composition is chemically incorporated into the molecular structure of the final products; especially the sulfonated calixarenes confer new, surprisingly improved properties to phenolic resins and novolaks and sensibly accelerate the condensation reactions.

9 Claims, No Drawings

CURING COMPOSITION FOR PHENOLIC RESINS

This application is a continuation-in-part of U.S. patent application No. 08/913,025, filed Sep. 5, 1997, now abandoned, which is a continuation-in-part of PCT/CH96/00095, filed Mar. 14, 1996.

BACKGROUND OF THE INVENTION

1. Field of the Invention

The present invention refers to a new curing composition for phenolic resins, especially for the polymerization of resoles and the formation of novolaks.

2. Description of the Prior Art

Phenolic resins have become known for a rather long time. They may generally be classified in two groups, namely the resoles and the novolaks. The resoles are obtained by a condensation reaction starting from optionally substituted phenols and aldehydes, in particular formaldehyde, in a basic medium, whereas the condensation of the same starting products but in an acidic medium and generally in using other stoichiometric ratios leads to novolaks which may be hardened by crosslinking at elevated temperatures in the presence of formaldehyde or a formaldehyde liberating compound, for example hexamethylene tetramine.

For their use in practice, the phenolic resins are crosslinked or cured to the so-called phenoplasts which may be hard foams, composite products that contain extenders or fillers such as bakelite, or others. Certain phenolic resins are self-curing, especially such resins that are crosslinking via their reactive methylol groups, but this self-curing does not yield well-defined end products, and the hardening process is very slow.

The crosslinking of resoles and the formation of novolaks occur according to acidic mechanisms. To this end, sulfuric acid or toluene sulfonic acid are used for example. However, the use of these acids has the major disadvantage that these acids are imprisoned as such within the forming polymers during the polycondensation and crosslinking reactions; the finished products will therefore contain free acids that are very difficult to remove from the product and cause slow decomposition reactions. Therefore, other possibilities have already been proposed in order to overcome this drawback.

U.S. Pat. No. 3,870,661 (to P. J. Crook and S. P. Riley) discloses a foamed phenol-formaldehyde resin, obtained by reacting a resole resin with a sulfonated novolak in the presence of a surfactant and a foaming agent. Furthermore, U.S. Pat. No. 3,872,033 (to P. Boden, P. J. Crook, M. E. Hall and S. P. Riley) discloses a solid fire-retarding phenol-formaldehyde resin, obtained by reacting a resole with a hardening composition produced by reacting a sulfonated phenol with formaldehyde, in the presence of a surfactant and a foaming agent.

The hardening compositions or catalysts, respectively, used in these two documents are composed, as judged by the present inventors, of sulfonated linear phenolic oligomers. In fact, the above two patents do not disclose or suggest any concrete composition or configuration of these hardeners. The one skilled in the art knows that under the reaction conditions described in the two patent specifications, linear phenolic oligomers are formed that are sulfonated after or before the oligomerization reaction using phenol and formaldehyde.

These reaction conditions further comprise reaction temperatures and reaction times during the condensation of phenol and formaldehyde of at most 130° C. and 65 minutes in Crook et al. and 50° C. and 2 hours in Boden et al. Where para substituted phenols are used in Crook et al., which would be a necessary condition for producing cyclic phenolic oligomers, the reaction conditions are 75° C./45 minutes, absolutely insufficient for the formation even of traces of cyclics.

The hardening compositions and curing catalysts, respectively, that are known from the above discussed prior art suffer from the disadvantage that their composition will change within wide limits when the reaction conditions, such as temperature, time and the concentrations and relative amounts of reactants, are not strictly the same from one batch to another. Since the chemical and most physical properties of the compositions are not disclosed (with the exception of solids content of aqueous solutions and their viscosity) and thus cannot be reproduced, the properties of phenolic foams produced from these compositions will widely vary too. This fact follows directly from the lecture of both U.S. Patents referenced above.

SUMMARY OF THE INVENTION

The present invention aims at eliminating the disadvantages of the known bridging compositions for resoles or condensation catalysts for novolaks by replacing the acids or the sulfonated linear phenolic oligomers that have been used until now, to improve the polycondensation and crosslinking processes, and to further improve the quality and usefulness of the finally obtained phenolic resins and novolaks. This object is attained by a new composition which contains (A) a first component selected from partially sulfonated cyclic phenolic oligomers and totally sulfonated cyclic phenolic oligomers, and (B) a second component selected from partially sulfonated linear phenolic oligomers and totally sulfonated linear phenolic oligomers, the weight ratio of component (A) to component (B) being comprised between 1 to 99% of component (A) and 99 to 1% of component (B).

The present invention further provides a curing composition, useful as a bridging agent in the polycondensation of resoles and in the formation of novolaks to be produced from a phenol and an aldehyde, said curing composition comprising an intimate blend of (A) from about 1% to about 99% of a first component selected from partially sulfonated cyclic phenolic oligomers and totally sulfonated cyclic phenolic oligomers, produced by reacting a para substituted phenol with formaldehyde in the presence of a basic catalyst and under substantially anhydrous conditions at temperatures of at least about 135° C., recovering cyclic phenolic oligomers from the reaction mixture, and partially or totally sulfonating these cyclic phenolic oligomers, and (B) from about 99% to about 1% of a second component selected from partially ant totally sulfonated linear phenolic oligomers produced by preparing linear phenolic oligomers from a phenol and formaldehyde in the presence of a basic or an acidic catalyst, recovering linear phenolic oligomers from the reaction mixture, and partially or totally sulfonating these linear phenolic oligomers.

Furthermore, this invention also includes a phenolic resin obtained by a polycondensation of a resole, the phenolic resin comprising, chemically incorporated into the microstructure of the polymer, a curing composition consisting of from about 1 to 100 % of at least one partially or totally sulfonated cyclic phenolic oligomer; that composition may further contain, if the percentage of said partially or totally sulfonated cyclic phenolic oligomer is lower than 100%, at least one partially or totally sulfonated linear phenolic oligomer and/or sulfonated monomeric phenol.

In an analogous manner, this invention also includes a novolak obtained by a polycondensation of an aldehyde, a phenol and a catalyst composition, the novolak comprising, chemically incorporated into its microstructure, said catalyst composition which consists of from about 1 to 100 % of at least one partially or totally sulfonated cyclic phenolic oligomer; that composition may further contain, if the percentage of said partially or totally sulfonated cyclic phenolic oligomer is lower than 100%, at least one partially or totally sulfonated linear phenolic oligomer and/or sulfonated monomeric phenol.

In this document, all percentages refer to the weight if not otherwise specified.

In a general manner, the sulfonated cyclic phenolic oligomers are called "calixarene sulfonic acids" and are produced by a dealkylating sulfonation of p-alkyl substituted calixarenes, or by first dealkylating such compounds and the sulfonating them. Details are discussed below.

Although it may be imagined that cyclic phenolic oligomers may theoretically be formed in the processes of the above discussed Crook and Boden references, the one skilled in the art knows that the amounts thereof possibly formed during the reactions which are disclosed, would be undetectably low since the reaction conditions, even if they were drastically reinforced, do not allow the cyclization of para unsubstituted phenolic oligomers; as to para substituted ones, anhydrous conditions are required, not contemplated in the references which do moreover not disclose or suggest any cyclic compound. Furthermore, the invention does not speculate upon the possible presence of imaginary compounds in the bridging compositions but contemplates the addition of determined amounts of calixarene sulfonic acids, having a determined structure and composition, to the bridging compositions; otherwise, the purpose of the invention, namely the provision of well determined compositions for making well tailored phenolic resins and novolaks in a fully reproducible manner, could not be attained.

The condensation of the phenol and the formaldehyde (formol) may be conducted under predetermined stoichiometric conditions in the presence of an acid or a base in such a manner that more or less condensed linear phenolic oligomers are obtained. The sulfonation of these oligomers, as such or as a mixture, yields partially or totally sulfonated linear phenolic oligomers, see the Crook and Boden references discussed above.

The sulfonated cyclic phenolic oligomers must be prepared from linear phenolic oligomers wherein the starting phenol carries a para substituent, preferably a tert-butyl group which is then removed prior to or during sulfonation and is partially or totally replaced by the sulfonic acid group $SO_3H$. These substances are already partly known, see, for example, the paper "Synthesis and acid-base properties of calix [4], calix [6] and calix [8] arene p-sulfonic acids" by J. P. Scharff, M. Mahjoubi and R. Perrin, *New J. Chem.* 1991, 15, 883–887. The cyclic phenolic oligomers are called "calixarenes", and the number of phenolic nuclei per molecule is inserted between brackets in the name. The synthesis of calixarenes calls for relatively severe reaction conditions, namely at least 135° C./2 hours in an anhydrous environment from which reaction water is continuously to be removed.

In a surprising manner, it has now been found that these sulfonated phenolic oligomers that are introduced into the resoles and/or used for the formation of novolaks instead of the acids (or the exclusively linear sulfonated phenolic oligomers) used until now, allow to obtain phenolic products having new, advantageous and unexpected properties. During the polycondensation of resoles to crosslinked or cured products, these substances replace at least partially but preferably totally the conventional catalyst acid; they do not remain as such within the crosslinked network but are chemically combined in the molecular network structure. When used for the formation of novolaks, they replace in part or better completely the usual catalyst acids and are also incorporated into the molecular chemical structure of the novolak.

In the present document, the composition of matter which is dealt with is named "curing composition" and is to be understood for comprising the crosslinking agents in the case of resoles and the "catalyst" of the novolak formation as well. This composition is defined by at least one partially or totally sulfonated cyclic phenolic oligomer, optionally also containing at least one partially or totally sulfonated linear phenolic oligomer, and/or a sulfonated phenol. By "phenolic" and "phenol", respectively, a compound is to be understood which has at least one aromatically unsaturated nucleus, substituted by at least one OH group and having unsubstituted ortho positions; this definition also includes phenols that are substituted in meta and/or para positions by classic radicals such as alkyl, alkenyl, aryl, ether, nitro, halogen, etc.; these substituents may be selected at will under the only condition that they must not impair the formation of the desired resoles and novolaks. These substituents may be used for conferring special properties to the final product; the one skilled in the art knows the principles of the action of particular substituents.

In the composition of this invention, the linear and cyclic oligomers may be totally or partially sulfonated. The ratio between sulfonated linear oligomers, sulfonated phenol and sulfonated cyclic oligomers may vary between all values from about 1 to about 99 % by weight. In the compositions, the mixture of linear and cyclic sulfonated phenolic oligomers, containing linear and cyclic entities in any proportion between 1 and 99%, preferably between 5 and 95%, is generally obtained by blending linear and cyclic oligomers, separately prepared and separately sulfonated; this way of action is preferred when the use of the mixture must closely be tailored to certain requirements of use. On the other hand, it is also possible to prepare a mixture of linear and cyclic phenolic oligomers, synthesized separately, and to sulfonate this mixture, the para dealkylation of the cyclic phenolic oligomers being carried out before or after preparing their blend with the linear entities.

Further preferred compositions contain from about 20 to about 50% of sulfonated monomeric phenol, the remainder being substantially equal parts of partially or totally sulfonated linear phenolic oligomers and of partially or totally sulfonated cyclic phenolic oligomers.

An important advantage of the compositions according to the present invention is that they are normally water soluble. Depending on the proportion of an aqueous solution of sulfonated linear oligomers and/or phenol, added to the cyclic oligomers, the viscosity of the crosslinking agent in the case of resoles can be modified and adjusted. The final viscosity of the crosslinking agent, constituted by the above mentioned mixture of sulfonated phenolic oligomers, may generally vary between 0.03 Pa·s and 3 Pa·s, measured at 20° C.

The use of the totally or partially sulfonated cyclic phenolic oligomers (calixarenes) as a crosslinking agent or a condensation catalyst according to this invention allows firstly to accelerate the reaction speed; mixtures with sulfonated linear phenolic oligomers in ratios of 0.5 to 5% will reduce the crosslinking time of resoles until a fifth of the duration required until now. Used as such or in mixtures, the sulfonated calixarenes permit the condensation of phenol and formol under the formation of novolaks; compared with the current use of p-toluene sulfonic acid, the condensation time is divided by about 4.

Secondly, the use of totally or partially sulfonated cyclic phenolic oligomers (calixarenes) according to the invention allows to better control the crosslinking and condensation processes. The crosslinking of the resoles and the formation of novolaks occur according to acid type mechanisms. The sulfonated cyclic phenolic oligomers show changeable acid-base properties due to their varying acidities. For example, the calix [4] arene-p-sulfonic acid has four strong acidities due to the $SO_3H$ groups and one strong acidity of the OH group (superacid), and three very weak acidities of a pK>11.

The use of totally or partially sulfonated cyclic phenolic oligomers (calixarenes) according to the invention further allows to reinforce the properties of the phenolic resins. The sulfonated phenolic oligomers, having the same nature as the phenolic resins, namely the resoles and the novolaks, are chemically incorporated into the microstructure of the polymer. They are perfectly compatible with the resins and enhance their mechanical and fire retarding properties. They are thermally and chemically stable and have high melting points. For example, the thermographimetric analysis of hydrated calix [6] arene p-sulfonic acid shows the high stability of the product. A first liberation of water occurs at about 90° C. only, then a second liberation of water at about 250° C. constituting a level that corresponds to the loss of 7 water molecules which is the number of water molecules associated to the calixarene, thus explaining the fire retarding and fire proof properties. The melting point is above 300° C., and the product does not decompose until 800° C.

Finally, it has been found that the use of totally or partially sulfonated cyclic phenolic oligomers (calixarenes) according to the invention allows to obtain phenolic materials having selective complexation properties; the sulfonated cyclic phenolic oligomers which are introduced into the condensation and crosslinking steps of phenolic polymers bring about, further to their acid functions, potential complexation sites. Due to their cavities or fractions, the calixarenes are privileged and selective sites for the complexation of ions, metals or weakly polar or even neutral molecules. For example, cone configured calix [4] arenes complex the cations $Li^+$, $Na^+$, $K^+$, $Rb^+$, $Cs^+$; $Ti^{4+}$, $Fe^{3+}$, $Co^{2+}$; certain neutral molecules such as toluene, xylene (selectively p-xylene); calix [6] arene p-sulfonic acid complexes $UO^{2+}$; and calix [8] arenes allow to complex $Eu^{3+}$ and other lanthanides. These selectively complexing properties of cyclic phenolic oligomers yield for example phenolic materials having recognizing, separating, depolluting, confining and other capacities.

DETAILED DESCRIPTION OF THE INVENTION

The following Examples further illustrate the invention in more detail without however limiting the invention regarding the exemplified compounds, methods, techniques and utilization.

I. Preparation of Phenolic Oligomers

A. Preparation of Linear Phenolic Oligomers

EXAMPLE 1

10 ml of 95% sulfuric acid, acting as a condensation catalyst in view of the small amount thereof, are slowly introduced into 220 g of phenol containing 20 g of water, under stirring and at a temperature of about 40° C. To this mixture, 45 ml of aqueous formaldehyde at 37% by weight ("formaline"), are slowly added under stirring and controlling the temperature that must not rise higher than 40° C. Stirring is then continued for about one hour. The aqueous solution of the linear phenolic oligomers thus obtained is cooled to room temperature, and the phenolic phase is separated from the aqueous one. The linear phenolic oligomers are recovered from the aqueous phase according to known techniques. The overall yield of oligomers, compared with the starting phenol, is about 85 to 92% by weight.

According to NMR (nuclear magnetic resonance) analyses of the protons and the carbon atoms, it has been found that the phenolic oligomers that have been formed in this Example have a degree of condensation between 2 and 12, i.e. that 2 to 12 phenol molecules are linked by methylene groups. The methylene bridges are fixed to the phenol molecules in the ortho and para position to the OH group. Ortho-para linkages and para-para linkages are preferred whereas ortho-ortho bridges exist too but are rather seldom. Therefore, if ortho-ortho linkages are required (essential for cyclic oligomers), the para position of the phenol must be blocked.

The same result is obtained, but requiring a condensation time of about two hours, when only 5 ml of 95% sulfuric acid are used.

B. Preparation of Cyclic Phenolic Oligomers

EXAMPLE 2

A mixture is prepared from 33.33 g of p-tert-butylphenol, 11.67 g of paraformaldehyde, 0.667 ml of 10N aqueous NaOH as a catalyst, and 200 ml of xylene as a solvent. The mixture is stirred under a nitrogen blanket and refluxed at about 135° C. during 4 hours. The water of condensation is continuously removed in a Dean-Stark trap.

During the reaction, cyclic phenolic oligomers are obtained which form a solid precipitate that is recovered by filtration after cooling down the reaction mixture. Regarding the yield, 91 % by weight of the starting phenol have been transformed to cyclic oligomers of the following general structural formula C:

wherein n is the number of condensed phenol molecules, and T is p-tert-butyl.

Analysis by HPLC (high performance liquid chromatography) gave the following composition of the reaction product, quoted in % by weight of the total:

| Compound | Yield | n in formula C |
|---|---|---|
| p-tert-butylcalix[8]arene | 87 % | 8 |
| p-tert-butylcalix[4]arene | 3 % | 4 |
| p-tert-butylcalix[5]arene | 1 % | 5 |
| p-tert-butylcalix[6]arene | 4 % | 6 |
| p-tert-butylcalix[7]arene | 4 % | 7 |
| p-tert-butylhomooxacalix[4]arene | 1 % | 4 |

EXAMPLE 3

20 g of p-tert-butylphenol, 3 g of KOH pastilles in a 84% purity, and 27 ml of formaline at 37% are blended. The mixture is stirred under a nitrogen blanket or nitrogen stream and heated until the formation of a viscous yellow mass. 200 ml of xylene are added thereto, and the whole is refluxed during 3 hours at 145° C. with removal of water from the mixture in a Dean-Stark device.

The reaction mixture is allowed to cool and is then filtered, and 21 g of a solid precipitate are collected that has the following composition by weight:

| | |
|---|---|
| p-tert-butylcalix[4]arene | 4% |
| p-tert-butylcalix[6]arene | 95% |
| p-tert-butylcalix[6]arene | 1%. |

EXAMPLE 4

The following components are mixed in an appropriate vessel: 20 g of p-tert-butylphenol, 12.4 ml of aqueous formaldehyde at 37%, and 0.24 g of solid NaOH at 98%. The mixture is heated to reflux during 2 hours and then allowed to cool down to room temperature which takes about 30 minutes. 200 ml of diphenyl ether, preheated to about 200° C., are then added, and the reaction mixture, placed under a nitrogen blanket, is refluxed during 90 minutes and then allowed to cool to room temperature. 300 ml of ethyl acetate are then added to the reaction mixture which is stirred during 15 minutes. The mixture is filtered, and 16 g of a solid precipitate are collected. This precipitate has the following composition by weight:

| | |
|---|---|
| p-tert-butylcalix[4]arene | 90% |
| p-tert-butylcalix[6]arene | 5% |
| p-tert-butylcalix[7]arene | 4% |
| p-tert-butylcalix[8]arene | 1%. |

II. Sulfonation of the Phenolic Oligomers

In order to prepare the compositions of this invention, it is necessary to sulfonate the compounds obtained according to part I of the Examples.

Generally, the sulfonation of phenols is easily effected in using concentrated sulfonic acid; elevated temperatures and p preferably a solvent or diluting medium. Unsubstituted phenol is sulfonated, regarding the first step of this reaction, in one of the three ortho, ortho and para positions; thus, statistically, monosulfonated phenol is composed of a mixture comprising 66.7% of phenol-o-sulfonic acid and 33.3% of phenol-p-sulfonic acid. Amounts of phenol-m-sulfonic acid and esterified phenol are below 1%.

The inventors have found previously (unpublished communication) that, due to sterical effects of the phenolic OH group and the sulfonic acid group ($SO_3H$), monosulfonation of phenol under the conditions outlined above yields a mixture comprising about 40% of phenol-o-sulfonic acid and 60% of phenol-p-sulfonic acid.

Linear phenolic oligomers according to the present invention are generally sulfonated under particular mild conditions whereas the cyclic oligomers require more drastic reaction conditions.

Sulfonation of Linear Phenolic Oligomers

EXAMPLE 5

Into 245 ml of phenolic oligomers, obtained in preceding Example 1, 70 ml of 95% sulfuric acid are introduced slowly under stirring in taking care that the temperature does not rise over 50° C. At the end of this introduction, stirring is still maintained for 16 hours. The sulfonated linear phenolic oligomers are obtained as a solution in water. The solution further contains about 20% of sulfonated monomeric phenol, referred to the weight of the sulfonated oligomers.

The analysis by $C^{13}$ NMR shows that the oligomers are only little condensed, one methylene bridge for 3 nuclei, that the bridges are of the ortho-para (40%) and para-para type (60%), and that the mixture contains sulfonated monomeric phenol and partially sulfonated o-p and p-p oligomers.

B. Sulfonation of Cyclic Oligomers

EXAMPLE 6

Total Sulfonation.

The first step of the preparation comprises a dealkylation of the oligomers in order to liberate sites for sulfonation.

35 g of the solid precipitate of Example 2 are dissolved in 350 ml of toluene, and 41 g of anhydrous aluminum chloride are added. The mixture is stirred at ambient temperature during 4 hours, and the dealkylation is finished. The reaction is stopped by the addition of 500 ml of 1N hydrochloric acid, and the organic phase is collected by decantation. The toluene is then evaporated.

The sulfonation of the dealkylated cyclic oligomers is effected by the addition of 350 ml of 98% sulfuric acid, and the reaction medium is stirred under a nitrogen atmosphere at 100° C. during 6 hours. The solids recovered by filtration are treated with ethyl acetate for initiating the crystallization.

It is found in the analysis that all cyclic oligomers are sulfonated, and that the para sites of the calixarenes all bear a —$SO_3H$ group; this is, in formula (C) above, all T are —$SO_3H$.

EXAMPLE 7

Partial Sulfonation

For partial sulfonation, a preliminary dealkylation is not required.

35 g of the solid precipitate of Example 2 are dissolved in 350 ml of toluene, and 400 ml of 98% sulfuric acid are added. The reaction mixture is stirred under a nitrogen atmosphere during 6 hours at 100° C. The solids are then recovered by filtration, and they are treated with ethyl acetate for bringing about their crystallization.

The analysis shows that the cyclic oligomers have been partially sulfonated in that the para sites of the calixarenes carry either a $SO_3H$ group or a tert-butyl group, some of them having been de-tert-butylated during sulfonation. About 20% of the para sites carry a sulfonic acid group; this is to say, each fifth of the substituents T in above formula (C) is —$SO_3H$, the other T being tert-butyl.

As already stated above, the bridging composition of the invention is obtained in blending the sulfonated phenolic oligomers of the linear and of the cyclic type, in the weight ratios mentioned above. All oligomers may also be mixtures of totally and partially sulfonated entities.

C. Preparation and Use of the Bridging Composition

The following Examples show the preparation and the use of the compositions according to the invention as well as new and useful fields of utilization.

EXAMPLE 8

A bridging composition is prepared by blending 0.4 g of p-tert-butylcalix [6] arene in its 95% purity as obtained in Example 3, totally sulfonated according to Example 6, with 7.6 g of a mixture of 20% of sulfonated phenol and 80% of sulfonated linear phenolic oligomers, see Examples 1 and 5 above.

This blend, 8.0 g, is mixed under mechanical stirring with 52 g of a low viscous resole, obtained in the following way:

800 g of phenol containing about 9% of water are mixed with 4 g of NaOH in the form of an aqueous solution. 320 g of paraformaldehyde are portionwise introduced into this mixture under stirring and during one hour. The temperature of the reaction mixture is controlled to a value between 40 and 50° C. After the introduction is complete, stirring is continued for at least 8 hours at the indicated temperature. The resole thus obtained is then transferred into an appropriate recipient where it is cooled down to room temperature.

The blend mentioned above is placed in a cylindrical mold which is then heated to 120° C. under a pressure of 5 bar and during 1 hour. A perfectly crosslinked block is obtained having a surprisingly high compression resistance, namely of more than 50 MPa.

EXAMPLE 9

A bridging composition is prepared from 0,8 g of a mixture, obtained in blending 0.27 g of the p-tert-butylcalix [n] arene product of each of Examples 1, 2 and 3. This mixture is totally sulfonated according to Example 6 above. The sulfonation product is mixed with 7.2 g of a blend consisting of 20% of sulfonated phenol and 80% of linear phenolic oligomers of Example 1, sulfonated according to Example 5. 8 g of this bridging composition is mixed with 34 g of powdered toxic ashes containing enriched Fe, Ni, Co, Pb, Zn, Cu, Cd and Cr. 34 g of the resole (Example 8) are added under stirring, and the mixture is transferred into a mold where it is hardened at 120° C. under a pressure of about 5 bar during one hour. A very hard block is obtained.

Lixiviating tests, using diluted aqueous bases and acids, have shown important ion capturing properties exerted by the crosslinked, calixarene containing block and opening thus new and wide application possibilities in the field of wastes confinement.

EXAMPLE 10

50 g of silica, namely a sand of Fontainebleau, and 5.3 g of the crosslinking agent of Example 7 are blended. 16 g of the resole of Example 8 are added to the blend. The very rapid exothermic crosslinking reaction, namely in less than 10 seconds, yields, after unmoulding, a solid block having a density of 1,500 g/dm$^3$.

EXAMPLE 11
Preparation of a Novolak

To 100 g of phenol, containing about 10% of water, 10 g of sulfonated p-tert-butylcalix [6] arene are added. After dissolution under stirring at a temperature of 40° C., 20 ml of aqueous formaldehyde at 37% are added, and the reaction temperature is maintained below 40° C. Stirring is maintained for about one hour. The aqueous phase is then decanted from the phenolic phase which is brought to dryness.

The proton and carbon NMR analysis shows that the phenolic phase has the structure of a novolak, having ortho-ortho, ortho-para and para-para methylene bridges, the ortho-ortho bridges being the most frequent ones. It will be self-understanding that it is possible to modify the ratios between the reactive components, the concentrations (especially of the sulfuric acid), the reaction temperatures, etc., in order to prepare the sulfonated phenolic oligomers and their modified precursors. Still other modifications are possible, for example the addition of diluents, finely divided fillers, viscosity or reactivity regulators, coloring agents, etc., to these compositions. All the se variations and modifications which are familiar to the one skilled in the art are comprised in the scope of this invention, defined by the appended claims.

What is claimed is:
1. A process for the preparation of a sulfonated, phenol based composition of matter comprising:
   (a) sulfonating a linear phenolic oligomer, obtained in a condensation reaction from phenol and formaldehyde in the presence of water and a catalytic amount of sulfuric acid at a temperature not exceeding 40° C., by reaction with concentrated sulfuric acid, and recovering a partially or totally sulfonated linear phenolic oligomer,
   (b) sulfonating a mixture of cyclic phenolic oligomers, obtained in a condensation reaction from (1) a para-substituted and ortho-unsubstituted phenol and (2) formaldehyde at a temperature of at least 135° C. under removal of water from the reaction mixture, with concentrated sulfuric acid, and recovering a mixture of partially or totally sulfonated cyclic phenolic oligomers, and
   (c) blending the components (a) and (b).

2. A process for the preparation of phenolic resins by crosslinking phenolic resoles using an acidic catalyst, comprising:
   adding to said phenolic resoles a curing composition consisting of said sulfonated, phenol based composition of matter obtained according to the process of claim 1, chemically incorporating said curing composition as a bridging composition into said phenolic resins which are formed.

3. The process of claim 2, wherein said curing composition further comprises sulfonated monomeric phenol.

4. A process for the preparation of phenolic resins by crosslinking phenolic resoles using an acidic catalyst, comprising the steps of adding to said phenolic resoles a curing composition comprising said sulfonated, phenol based composition of matter obtained according to the process of claim 2, and chemically incorporating said curing composition as a bridging composition into said phenolic resins which are formed.

5. The process of claim 4, wherein said curing composition further comprises sulfonated monomeric phenol.

6. A process for the preparation of novolaks by reacting a phenol with an aldehyde or an aldehyde precursor in the presence of an acidic catalyst, comprising the steps of adding to a mixture of said phenol and said aldehyde or aldehyde precursor an acidic catalyst composition comprising said sulfonated, phenol based composition of matter obtained according to the process of claim 1, and chemically incorporating said curing composition as a bridging composition into said novolaks which are formed.

7. The process of claim 6, wherein said acidic catalyst composition further comprises sulfonated monomeric phenol.

8. A process for the preparation of novolaks by reacting a phenol with an aldehyde or an aldehyde precursor in the presence of an acid catalyst, comprising the steps of adding to a mixture of said phenol and said aldehyde or aldehyde precursor an acidic catalyst composition comprising said sulfonated, phenol based composition of matter obtained according to the process of claim 2, and chemically incorporating said curing composition as a bridging composition into said novolaks which are formed.

9. The process of claim 8, wherein said acidic catalyst composition further comprises sulfonated monomeric phenol.

* * * * *